Figure 1:
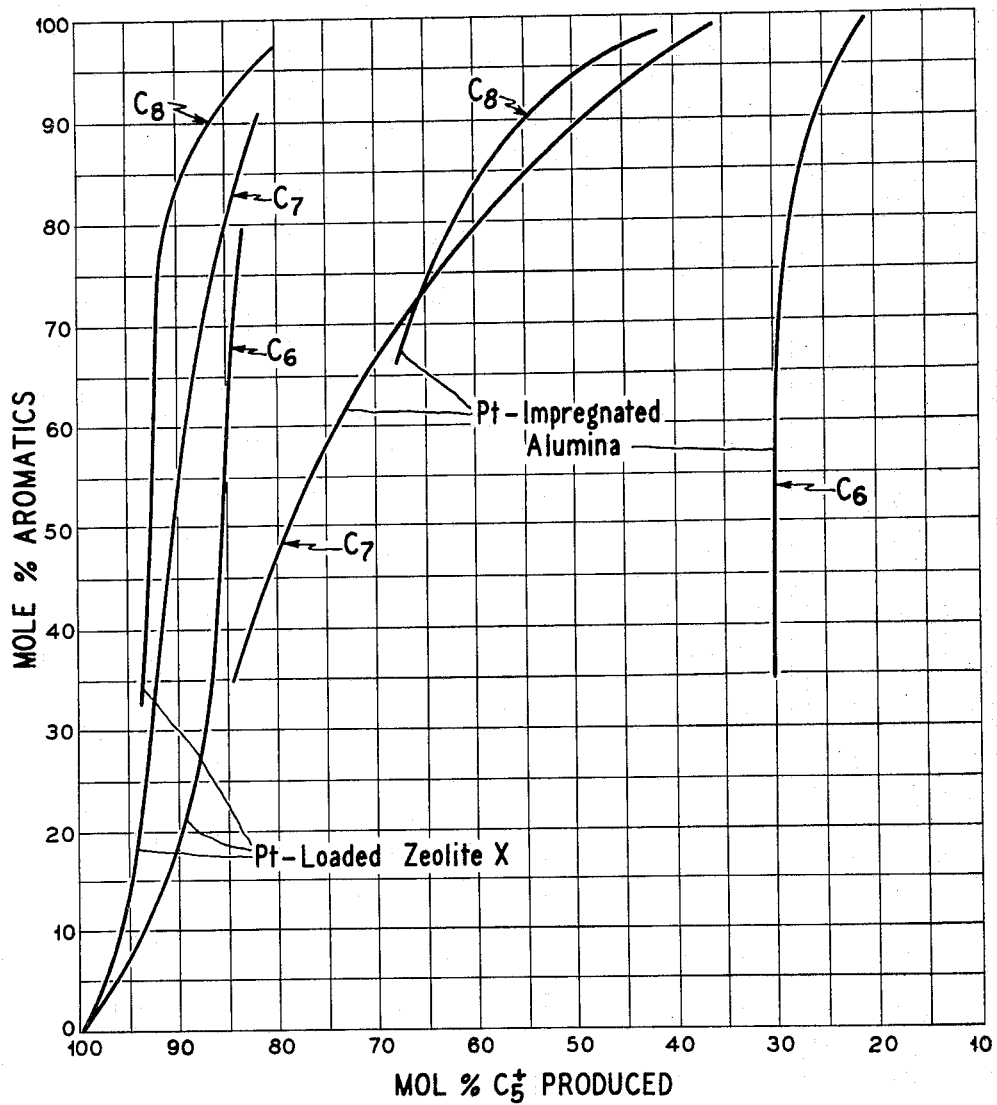

INVENTOR
ROBERT M. MILTON

United States Patent Office
3,236,903
Patented Feb. 22, 1966

3,236,903
HYDROCARBON UPGRADING PROCESS
Robert M. Milton, Buffalo, N.Y., assignor to Union
Carbide Corporation, a corporation of New York
Filed Feb. 6, 1962, Ser. No. 171,445
16 Claims. (Cl. 260—666)

This application is a continuation-in-part of application Serial No. 762,961 filed September 24, 1958, now U.S. Patent No. 3,200,083.

This invention relates to a process for upgrading hydrocarbons using as a catalyst, zeolitic molecular sieves containing a catalytically active metal, as for example at least one metal selected from the group consisting of ruthenium, rhodium, palladium, osmium, iridium and platinum which are suitable for use as improved catalysts.

Ruthenium has been known to be a suitable Fisher Tropsch hydrocarbon synthesis catalyst. In addition, rhodium, palladium, osmium, iridium and platinum may also be employed for this purpose, platinum being preferred. Rhodium is commonly employed as an isomerization catalyst particularly when supported by gamma-alumina or by a silica-alumina gel. Palladium is a very effective hydrogenation catalyst.

Platinum is well known as a catalyst for gasoline reforming particularly when supported by gamma-alumina or silica-alumina gel. When supported with gamma-alumina or silica-alumina gel platinum is suitable for the catalysis of the isomerization of hydrocarbons.

It would be desirable to provide these catalysts in a form having a very high metal surface as an integral part of a specific support material.

Accordingly, it is an object of this invention to provide an improved process for upgrading hydrocarbons using a superior catalyst. As used herein, the expression "hydrocarbon conversion" and "upgrading" includes but is not limited to processes for hydrocracking, polymerization, alkylation, reforming, hydroforming, isomerizing, aromatizing, hydrogenating, dehydrogenating, and dehydrocyclization.

Other objects will be apparent from the subsequent disclosure and appended claims.

Figure 2:
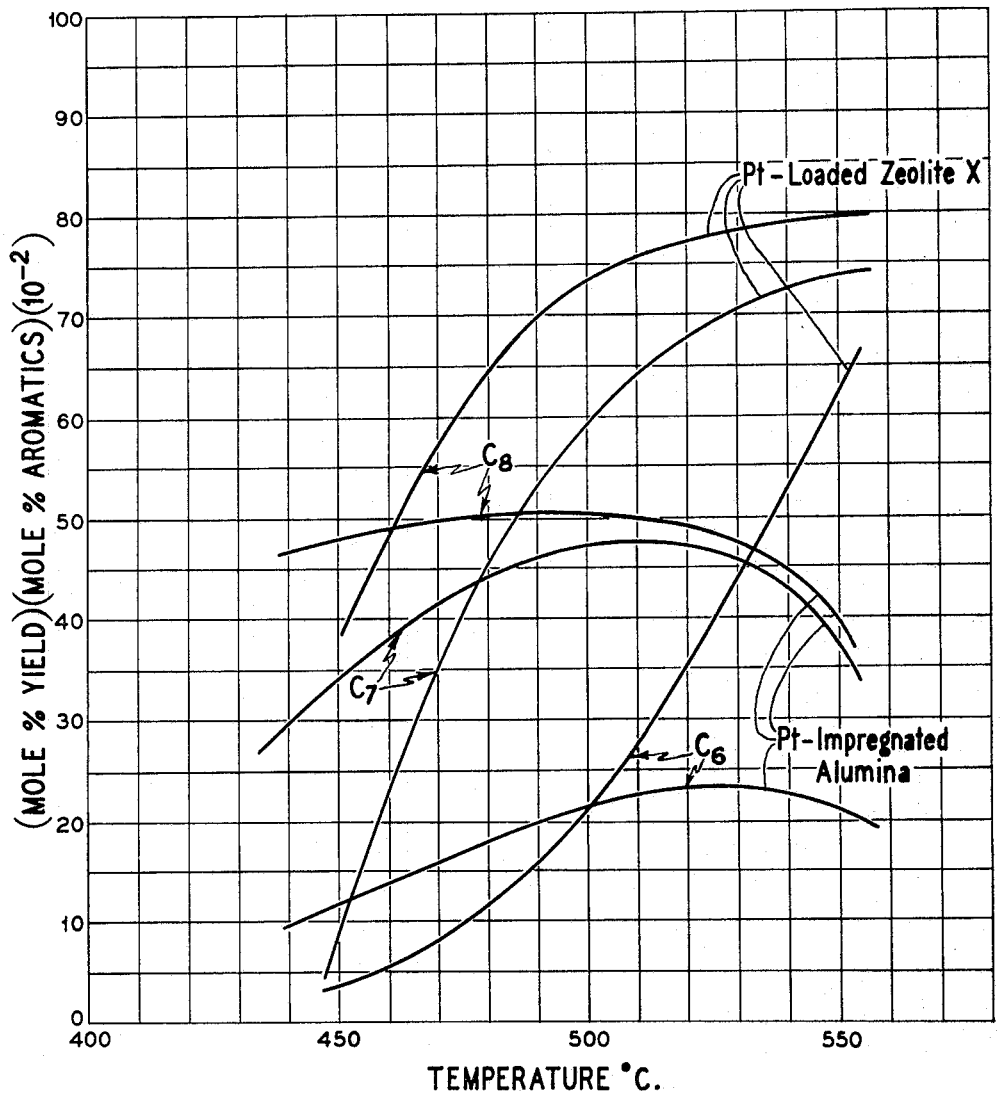

In the drawings:

FIG. 1 is a graph illustrating the reforming selectivity of certain catalysts, and FIG. 2 is a graph illustrating the reforming activity of certain catalysts as a function of temperature.

A composition of matter which can be employed in the process of the present invention comprises a zeolitic molecular sieve containing a substantial quantity of at least one catalytically active metal, preferably selected from the group consisting of ruthenium, rhodium, palladium, osmium, iridium and platinum, the metal being preferably loaded or deposited in the internal adsorption area of the zeolitic molecular sieve. This composition of matter contains the metal in a form having a high specific surface which is suitable for catalysis.

Zeolitic molecular sieves, both natural and synthetic, are metal aluminosilicates. The crystalline structure of these materials is such that a relatively large adsorption area is present inside each crystal. Access to this area may be had by way of openings or pores in the crystal. Molecules are selectively adsorbed by molecular sieves on the basis of their size and polarity among other things.

Zeolitic molecular sieves consist basically of three-dimensional frameworks of $SiO_4$ and $AlO_4$ tetahedra. The tetrahedra are cross-linked by the sharing of oxygen atoms. The electrovalence of the tetrahedra containing aluminum is balanced by the inclusion in the crystal of a cation, for example, metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of molecules having a size, shape, and energy which permits entry of the adsorbate molecules into the pores of the molecular sieves.

The zeolitic molecular sieves, to be useful in the present invention, must be capable of adsorbing benzene molecules under normal conditions of temperatures and pressure. Included among these molecular sieves, and preferred for the purposes of the present invention is the synthetic zeolite X, described and claimed in U.S. Patent No. 2,882,244 issued April 14, 1959 to R. M. Milton.

The general formula for zeolite X, expressed in terms of mol fractions of oxides, is as follows:

$$0.9 \pm 0.2 M_{2/n}O : Al_2O_3 : 2.5 \pm 0.5 SiO_2 : 0 \text{ to } 8\ H_2O$$

In the formula "M" represents a cation, for example, hydrogen or a metal, and "n" its valence. The zeolite is activated or made capable of adsorbing certain molecules by the removal of water from the catalyst as by heating. Thus the actual number of mols of water present in the crystal will depend upon the degree of dehydration or activation of the crystal. Heating to temperatures of about 350° C. has been found sufficient to remove substantially all of the adsorbed water.

The cation represented by the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is:

$$0.9 Na_2O : Al_2O_3 : 2.5 SiO_2 : 6.1 H_2O$$

The major lines in the X-ray diffraction pattern of zeolite X are set forth in Table A below:

TABLE A

| d Value of reflection in A.: | 100 $I/Io$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the K$\alpha$ doublet of copper, and a Geiger counter spectrometer with a strip chart pen recorder was used. The peak heights, I, and the positions as a function of $2\theta$, where $\theta$ is the Bragg angle, were read from the spectrometer charge. From these, the relative intensities, $$\frac{100I}{Io}$$

where $Io$ is the intensity of the strongest line or peak, and $d$(obs) the interplanar spacing in A., corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite are formed. Preferably the reactants should be such that in the solution the following ratios prevail:

| | |
|---|---|
| $SiO_2/Al_2O_3$ | 3–5 |
| $Na_2O/SiO_2$ | 1.2–1.5 |
| $H_2O/Na_2O$ | 35–60 |

One method available for preparing the metal-containing zeolitic molecular sieves comprises treating the molecular sieves with an aqueous solution containing complex water-soluble metal-amine cations, both organic and inorganic, of the metal to be deposited in the crystal structure. These complex cations ion-exchange with the cations normally present in the zeolite. The exchanged zeolite is then removed from the solution, dried and activated, for example, by heating the molecular sieve up to a temperature of about 250° C. in a flowing stream of inert dry gas or vacuum. The activation should be effected at a temperature below the temperature at which the complex cations are destroyed. The activated molecular sieve may then be subjected to heat treatment to a temperature not exceeding about 650° C. and preferably not exceeding about 500° C. in vacuum or inert atmosphere whereby the complex cation is destroyed and the metal is reduced in the molecular sieve. Should the thermal treatment be insufficient to reduce the metal of the complex cations to the elemental state, chemical reduction either alone or in combination with thermal reduction may be employed. Alkali metals such as sodium are suitable reducing agents for this purpose. Throughout the operation excessive temperatures and extremes of acidity are to be avoided since they may tend to destroy the crystal structure of the zeolite molecular sieve.

To illustrate this method of preparing a catalyst used in the process of the present invention, tetramine platinous chloride hydrate, $Pt(NH_2)_4Cl_2 \cdot H_2O$, was prepared according to the method found in the reference, Fernelius, W.C., Inorganic Syntheses, vol. II, 250 (1946). To 2.5 grams of tetramine platinous chloride hydrate in 500 milliliters of water was added 62 grams of hydrated sodium zeolite X powder with stirring. After stirring for one hour the resultant suspension was filtered and washed first with distilled water, then alcohol, and finally ether. It was dried in air. Some of the sodium cations had been replaced by a complex cation containing platinum. Upon heating the complex ion-exchanged zeolite at 375° C. in hydrogen for two hours, ammonia was evolved and the platinum was reduced to the metallic state within the molecular sieve. Hydrogen cations replaced the complex cations which had been present in the molecular sieve structure and the remainder of the cations were the original sodium cations.

To synthesize the palladium-containing molecular sieve catalyst, approximately 1.4 grams of palladium chloride were dissolved in 100 milliliters of concentrated ammonia. The solution was heated to boiling to remove excess ammonia and cooled. Ten grams of sodium zeolite X were suspended in the solution and the suspension was stirred for 20 minutes. The zeolite crystals were filtered and then washed with water then alcohol and ether. The crystals were heated to 375° C. in air yielding a palladium-loaded molecular sieve containing 5.7 wt.-percent of palladium metal.

In a preparation of the ruthenium-containing catalyst, an aqueous solution of complex ruthenium-amine complex cations was prepared by dissolving a gram of ruthenium chloride in 25 milliliters of water and adding thereto 150 milliliters of aqueous ammonia. The solution was boiled for two hours after which it was red-violet. To this solution was added 7 grams of sodium zeolite X slurried in 50 milliliters of water. It was stirred for 5 minutes and then filtered. The product was dried overnight at 100° C. Heating the molecular sieve at an elevated temperature produced a ruthenium-metal-loaded zeolite containing 7.1 wt.-percent ruthenium.

As a further example, an aqueous suspension consisting of 20 grams of a large pore crystalline zeolite suspended in 200 milliliters of water was mixed with 100 milliliters of an aqueous solution containing one gram of tetramine platinous chloride hydrate $$[Pt(NH_3)_4]Cl_2 \cdot H_2O$$

The mixture was stirred for 2 hours. The ion-exchanged zeolite produced was removed by filtering, washed with distilled water and dried, at 110° C. for one hour. The dried product was heated at 400° C. to drive off volatile constituents including the intracrystalline water; decomposition of the complex cations resulted to produce a platinum-loaded molecular sieve containing 2.9 wt.-percent of platinum.

Still another process which is suitable for the preparation of the catalyst used in the present invention comprises intimately contacting an activated zeolitic molecuar sieve (activated by any of the methods described previously) in an inert atmosphere with a fluid decomposable compound of the metal to be contained in the zeolitic molecular sieve whereby the decomposable compound is absorbed by the zeolite molecular sieve in the inner adsorption region of the zeolitic molecular sieve. The adsorbed decomposable compound is then reduced in situ to provide a metal having a high specific surface of corresponding high chemical and catalytic activity.

Adsorbable compounds which are suitable for introducing the metal into the molecular sieve are carbonyl and carbonyl hydrides. The reduction of the compound may be either chemical or thermal. In the case of chemical reduction the reducing agent may be deposited first in the inner adsorption area and the reducible compound introduced subsequently or alternatively the reducible compound may be sorbed into the inner adsorption area and the reducing agent introduced subsequently.

To illustrate this process a platinum ethylenic complex compound was prepared by refluxing anhydrous sodium hexachloroplatinate (6 grams) with absolute ethanol (50 milliletters). The complete reaction of the sodium hexachloroplatinate was insured by the addition of saturated ammonium chloride solution which precipitated unreacted sodium hexachloroplatinate as an insoluble ammonium salt. The resulting solution was evaporated to dryness and the platinum-ethylenic complex was extracted with chloroform (150 millilieters). Zeolite X powder (5 grams) was added to the solution and shaken for one hour to permit the adsorption of the platinum-ethylenic complex from the solution by the zeolite. The solution was then filtered and the zeolite dried. The zeolite was treated with hydrogen at 150° C. to reduce the adsorbed platinum-ethylenic complex to free platinum metal. The resulting product was zeolite X containing 2.18 percent by weight metallic platinum as determined by elemental analysis.

As was stated previously in the utilization of these metals for catalytic purposes they have also been supported by alumina, silica, mixtures thereof and aluminosilicates; when contained in the inner adsorption area of molecular sieves the metals provide superior catalysts because the metal is contained in the finest possible distribution in a highly active form. Molecular sieves have a higher surface area than any of the other catalyst supports. The uniform structure of the molecular sieves provides uniform activity throughout the catalytic surface. Further certain properties characteristic of zeolitic molecular sieves still further enhance the use of the metal-loaded products. For example, by properly selecting the pore size and the crystal structure by proper selection of molecular sieves it is possible to obtain the most favorable conditions for a given reaction even to the point of carrying on reactions in the presence of other materials which would normally interfere with the reaction. The selectivity of the various molecular sieves will in any case exclude the interfering catalysts from the catalytic surface while in no way preventing the desired materials from contacting this surface. Further the chemical and catalytic nature of the molecular sieve itself may be altered to suit the requirements of the reactants by the selection of the most suitable cation present in the molecular sieve structure.

As used herein, the term "activation" is employed to designate the removal of water from the zeolitic molecular sieves, i.e., dehydration, and does not refer to catalytic activity. The zeolitic molecular sieves containing the elemental metal exhibit catalytic activity.

The catalyst used in the process of the present invention has a surface area four times that expected with most alumina, silica or aluminosilicate supported metals thereby providing a greater surface area available for reaction. Since the external surface of the molecular sieve represents less than 1 percent of the total surface area, it may be seen that there is an extremely large area available for catalysis in the internal portion of the molecular sieve. Since this region is available only through pores of molecular size, it may be seen that selective catalysis may be obtained in a system containing a mixture of molecules, some of which are too large to enter the pores, whereas others are capable of entering the pores.

The process of this invention is exemplified by the ensuing experiments:

*Example 1*

Platinum-loaded sodium zeolite X containing 2.18 wt.-percent of platinum (prepared by the decomposition of a platinum-ethylene complex) was added to 15 cubic centimeters of cyclohexene and the mass was subjected to 55 p.s.i.g. hydrogen pressure at room temperature. The results are shown in Table B. This experiment demonstrates hydrogenation of a hydrocarbon by contact with a metal-containing molecular sieve catalyst.

TABLE B

| Test | Amount of catalyst used, gs. | Total platinum contained in catalyst, milligrams | Time necessary for complete hydrogenation, minutes |
|---|---|---|---|
| 1 | 3.0 | 11.4 | 8 |
| 2 | 1.7 | 37.0 | 2.5 |

Sample 1 was prepared by adsorbing the platinum-ethylene compound from an acetone solution and thermally decomposing the dried product. Sample 2 was prepared by adsorbing the platinum-ethylene compound from chloroform solution and chemically decomposing it with hydrogen.

*Example 2*

Following procedures similar to Example 1, a 15 percent conversion of tetralin to naphthalene was attained by refluxing tetralin with platinum-loaded sodium zeolite X containing 0.5 wt.-percent of platinum for four hours at 207° C. This experiment demonstrates dehydrogenation of a hydrocarbon by contact with a metal-containing molecular sieve catalyst.

*Example 3*

Eighteen grams of platinum-loaded sodium zeolite X containing 0.45 wt.-percent of platinum were charged into a reactor tube. The catalyst was prepared by reaction of ammonium-exchanged zeolite X with $$[Pt(NH_3)_4]Cl_2 \cdot H_2O$$ 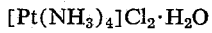

and decomposition of the resulting complex cation, the Na content being 5.1 wt.-percent or 6.9 wt.-percent $Na_2O$. Hydrogen at the rate of 1.9 cubic feet per hour and cyclohexane at the rate of 10 milliliters of liquid per hour were passed through the catalyst bed at atmospheric pressure and at a temperature of 375° C. The product contained 78 volume percent benzene and 22 volume percent cyclohexane. This experiment demonstrates aromatization and dehydrogenation of a hydrocarbon by contact with a metal-containing molecular sieve catalyst.

*Example 4*

Following procedures similar to Example 3, methyl cyclohexane was converted completely to toluene at atmospheric pressure and at a temperature of 380° C., another illustration of hydrocarbon aromatization and dehydrogenation.

*Example 5*

Another series of experiments were performed in which platinum-loaded zeolite X was contacted with a n-heptane and hydrogen mixture under hydrocarbon conversion conditions. The catalyst was prepared by dissolving chloroplatinic acid in a hot, concentrated solution of $NH_4OH$ to give various platinum (IV) amine complexes. Sodium zeolite X powder was slurried with this solution, then filtered and washed to provide amine ion-exchanged molecular sieve. The latter was bonded with 20–30 wt.-percent clay and heated at 500–550° C. for decomposition of the amine complex and retention of 0.6 wt.-percent elemental platinum highly dispersed within the inner adsorption region. The asformed catalyst was examined by X-ray diffraction and electron microscopy, and it was found that no crystal change had occurred in the activation procedure. Analytical study indicated the catalyst contained about 10.7 wt.-percent Na, or 14.4% as $Na_2O$.

Hydrogen was bubbled through the liquid hydrocarbon to obtain a hydrogen to n-heptane mole ratio of about 14 to 1. The mixture was then passed over the catalyst in a steel tube ⅞ in. I.D. x 18 in. long. The exit gases were air cooled and then condensed in a series of cold traps. Runs were made at atmospheric pressure and four different feed-catalyst contact temperatures, these being 425° C., 438° C., 485° C. and 523° C. The many conversion products obtained were separated and analyzed by a vapor phase chromatograph and an infrared spectrometer, and the following results were obtained:

TABLE C

| Component (mol percent of total product) | Expt. 1, 425° C. | Expt. 2, 438° C. | Expt. 3, 485° C. | Expt. 4, 523° C. | Type of hydrocarbon conversion |
|---|---|---|---|---|---|
| n-Butane | 3–5 | 2–4 | | | Hydrocracking. |
| 2-methylbutane | 2 | 1–2 | | | Reforming. |
| n-Pentane | 4–5 | 4–6 | | | Hydrocracking. |
| 2-methylpentane | 2 | 3 | | | Reforming. |
| 3-methylpentane | 2 | 2½ | 4–6 | 4–6 | Do. |
| n-Hexane | 3 | 3½ | | | Hydrocracking. |
| 2,4-dimethylpentane | 1 | 1 | | | Isomerization. |
| 2-methylhexane | 5½–6 | 5–6 | | | Do. |
| 3-methylhexane | 7 | 6–7 | | | Do. |
| n-Heptan | 27–29 | 17–19 | 1–1½ | 3–4 | None. |
| Methylcyclohexane | 6½–7 | 3½ | None | None | Cyclization. |
| Benzene | 3–4 | 8 | 15–16 | 17–18 | Aromatization. |
| Toluene | 29–31 | 36–38 | 76–77 | 75–76 | Dehydrocyclization. |

It will be apparent from a study of the product data that at lower reaction temperatures there was a substantial amount of cracking and reforming, whereas at the higher temperature aromatization to benezene and toluene was virtually complete. Samples of the spent molecular sieve catalyst were analyzed by X-ray diffraction, and no changes had occurred in the crystal structure by virtue of its usage.

A prior art amorphous catalyst, platinum-impregnated alumina, was tested in a manner similar to Experiment No. 2 above, and at a reaction temperature of 438° C. The product contained only about 20% toluene, the remainder being unreacted n-heptane. Since the toluene conversion with platinum-loaded zeolite X catalyst at this temperature was 36–38%, the present invention represents an improvement in conversion efficiency of about 100%.

*Example 6*

By the Microcatalytic-Chromatographic Technique of Kokes et al. J.A.C.S., 77, 5860 (1955) a series of tests were performed illustrating the conversion at various temperatures of a series of pure hydrocarbon feeds in a stream of hydrogen gas, using zeolite X loaded with a half weight percent platinum in the same manner as the catalyst of Example 5. The reactor was a glass tube of 8 mm. I.D. by 18 cm. long, and held 3 ml. of molecular sieve catalyst in pelletized form. The products were analyzed by a vapor fractometer, and the following results obtained:

in a given chromatogram with that of another. A sample of $0.01 \pm .005$ cc. gave an area of $5,000 \pm 2,500$ units for most compounds. The introduction of fixed size samples into the reactor was difficult due to the pressure head in the reactor. The amount of activity, defined as the amount of feed compound used in the reactor, increases with increasing temperature and decreases with increasing sample size.

Cyclohexane was found to be much more reactive than the normal $C_6$ and $C_7$ compounds in producing aromatics while the amount of "lights" produced was much less. In passing from the normal $C_5$ to $C_6$ and $C_7$, the activity of te compound increases but the amount of "lights" decreases.

*Example 7*

The process of this invention was experimentally compared with a prior art process in which 0.4 wt.-percent platinum-impregnated alumina, an amorphous material, was used as the catalyst. The molecular sieve catalyst was 0.5 wt.-percent platinum-loaded zeolite X, prepared by cation exchanging $Pt(NH_3)_4^{++}$ for $Na^+$ in the crystalline structure, followed by thermal decomposition of the complex. Pure feeds of cyclohexane, hexane, heptane and octane were contacted with each catalyst at a temperature of 450° C., the apparatus being the same as in Example 6 with hydrogen also being the gas employed. Two milliliters of each catalyst were activated in a hydrogen

TABLE D

| | Type of conversion | Temperature | | | | |
|---|---|---|---|---|---|---|
| | | 550° C. | | | 450° C. | |
| n-Hexane feed: | | | | | | |
| Relative sample size [1] | | 4,902 | 3,460 | 824 | 4,446 | -------- |
| Mole-Percent "lights" produced [2] | Hydrocracking | 32 | 33 | 63 | 18 | -------- |
| Mole-Percent hexane unreacted | None | 43 | 36 | 7 | 75 | -------- |
| Mole-Percent "heavys" produced [3] | Isomerization | 9 | 8 | 1 | 4.5 | -------- |
| Mole-Percent benzene produced | Dehydrocyclization | 18 | 24 | 28 | 2 | -------- |
| Cyclohexane feed: | | | | | | |
| Relative sample size | | 9,700 | 6,602 | 6,574 | 5,194 | 5,094 |
| Mole-Percent "lights" produced [2] | Hydrocracking | 3 | 7 | 9 | 1 | 1 |
| Mole-Percent cyclohexane unreacted | None | 5 | 1 | 2 | 13.5 | 8.5 |
| Mole-Percent benzene produced | Dehydrocyclization | 94 | 92 | 89 | 85.5 | 90.5 |
| n-Heptane feed: | | | | | | |
| Relative sample size | | 13,633 | 4,896 | 966 | -------- | -------- |
| Mole-Percent "lights" produced [2] | Hydrocracking | 20 | 22 | 56 | -------- | -------- |
| Mole-Percent heptane unreacted | None | 26 | 33 | 6 | -------- | -------- |
| Mole-Percent "heavys" produced [3] | Isomerization | 2 | 1 | 0 | -------- | -------- |
| Mole-Percent benzene produced | Reforming | 2 | 2 | 8 | -------- | -------- |
| Mole-Percent toluene produced | Dehydrocyclization | 50 | 43 | 30 | -------- | -------- |
| n-Pentane feed: | | | | | | |
| Relative sample size | | 5,068 | 4,673 | 1,317 | -------- | -------- |
| Mole-Percent "lights" produced [2] | Hydrocracking | 43 | 38 | 64 | -------- | -------- |
| Mole-Percent n-pentane unreacted | None | 44 | 53 | 31 | -------- | -------- |
| Mole-Percent pentenes produced | Dehydrogenation | 3 | 4 | 3 | -------- | -------- |
| Mole-Percent cyclopentanes produced | Cyclization | 3 | 5 | 2 | -------- | -------- |

[1] Relative sample size equals the total area under all chromatogram peaks.
[2] "Lights"—compounds that have lower molecular weights than the feed compound, mostly $C_1$-$C_3$.
[3] "Heavys"—compounds whose molecular weights are at least that of the feed hydrocarbon, other than aromatics.

In these experiments relative catalyst sample sizes were computed by comparing the total area of all the peaks stream by heating at 500° C. for four hours prior to making the runs. The results where as follows:

TABLE E

| | Type of conversion | Pt on alumina | | | Pt-loaded zeolite X | | |
|---|---|---|---|---|---|---|---|
| Cyclohexane feed: | | | | | | | |
| Relative sample size [1] | | 7,751 | 7,974 | -------- | 6,724 | -------- | 14,122 |
| Mole-percent $C_1$-$C_4$ produced [2] | Hydrocracking | 18.3 | 15.4 | -------- | 2.2 | -------- | 1.5 |
| Mole-percent $C_5$-$C_6$ produced | Reforming | 1.7 | 1.6 | -------- | 0.4 | -------- | 1.1 |
| Mole-percent cyclohexane unreacted | None | 0.0 | 0.0 | -------- | 0.0 | -------- | 0.0 |
| Mole-percent benzene produced | Dehydrogenation | 80.0 | 82.0 | -------- | 96.5 | -------- | 97.0 |
| Mole-percent toluene produced | Reforming | <1 | <1 | -------- | 0.9 | -------- | 0.6 |
| Hexane feed: | | | | | | | |
| Relative sample size [1] | | 5,170 | 8,666 | 14,684 | 5,955 | 6,282 | 11,590 |
| Mole-percent $C_1$-$C_4$ produced [2] | Hydrocracking | 73.4 | 71.7 | 47.6 | 13.7 | 16.6 | 9.7 |
| Mole-percent $C^5$-$iC_6$ | Reforming | 7.5 | 5.2 | 20.5 | 23.1 | 27.0 | 15.8 |
| Mole-percent hexane unreacted | None | 0.5 | 0.7 | 8.7 | 30.7 | 30.0 | 43.1 |
| Mole-percent $C_6$+ (less aromatics) | Reforming | <1 | 1.2 | 12.9 | 9.1 | 9.1 | 9.4 |
| Mole-percent benzene produced | Dehydrocyclization | 18.6 | 21.2 | 18.9 | 20.1 | 17.4 | 20.9 |
| Mole-percent toluene produced | Reforming | <1 | <1 | <1 | 0.6 | 0.7 | 1.3 |

TABLE E (Continued)

| | Type of conversion | Pt on alumina | | | Pt-loaded zeolite X | | |
|---|---|---|---|---|---|---|---|
| Heptane feed: | | | | | | | |
| Relative sample size [1] | | 7,702 | 14,403 | | 2,623 | 2,737 | 7,754 |
| Mole-percent $C_1$–$C_4$ produced [2] | Hydrocracking | 42.1 | 37.3 | | 14.0 | 19.3 | 13.4 |
| Mole-percent $C_5$–$iC_7$ produced | Reforming | 10.2 | 12.3 | | 22.7 | 21.5 | 19.8 |
| Mole-percent heptane unreacted | None | 1.1 | 2.4 | | 16.4 | 6.1 | 13.0 |
| Mole-percent $C_7$+ (less aromatics) | Reforming | 0.1 | 0.7 | | 5.0 | 3.0 | 4.3 |
| Mole-percent benzene produced | do | 5.8 | 4.2 | | 1.8 | 2.7 | 1.6 |
| Mole-percent toluene produced | Dehydrocyclization | 41.0 | 43.2 | | 39.0 | 49.5 | 53.5 |
| Octane feed: | | | | | | | |
| Relative sample size [1] | | 6,227 | 12,978 | | | | 5,379 |
| Mole-percent $C_1$–$C_4$ produced [2] | Hydrocracking | 41.5 | 31.0 | | | | 11.7 |
| Mole-percent $C_5$–$iC_8$ produced | Reforming | 7.8 | 14.9 | | | | 18.0 |
| Mole-percent octane unreacted | None | 0.0 | 1.5 | | | | 0.0 |
| Mole-percent $C_8$+ (less aromatics) | Reforming | 0.0 | 0.0 | | | | 0.0 |
| Mole-percent benzene produced | do | 6.1 | 2.9 | | | | 1.1 |
| Mole-percent toluene produced | do | 13.8 | 7.7 | | | | 8.2 |
| Mole-percent ethylbenzene produced | Dehydrocyclization | 7.0 | 10.3 | | | | 21.1 |
| Mole-percent o-, m-, and p-xylenes produced | do | 23.8 | 31.7 | | | | 40.0 |

[1] Relative sample size equals the total area under all peaks.
[2] These mole precents are accurate to ±25% of the value reported except for very low percentages.

For these results, it is apparent that the present process represents a substantial improvement over the prior art for reforming. The amount of undesirable lights ($C_1$–$C_4$) produced by the Pt-loaded zeolite X is only ⅓ to ¼ that produced by the alumina catalyst. The increase in total aromatics produced by Pt-loaded zeolite X over the prior art catalyst increases as one progresses from $C_6$ to $C_8$, while the amount of $C_5$–$iC_n$ is consistently greater.

Table F is a comparative chemical and physical analyses for the two catalysts.

*Example 8*

The experiments of Example 7 at a catalyst-hydrocarbon feed contact temperature of 500° C. were extended to 450° C. and 550° C. To properly evaluate the data, a standard sample catalyst size was deduced for each feed at a given temperature. This was done by plotting the mole percent $C_5$+ fraction versus sample size for each compound at 450°, 500° and 550° C. Two arbitrary sample sizes, 5,000 and 10,000 units of area, were taken as standard and plots prepared of mole percent aromatics in the $C_5$+ fraction versus mole percent $C_5$+ produced. These interpolated results are as follows:

TABLE F

| | Platinum loaded in zeolite X | Platinum impregnated on alumina |
|---|---|---|
| Platinum, percent | 0.50±0.60 | 0.40±0.03. |
| Ammonia | <0.3 | <0.3. |
| Chloride | 0.06±0.05 | 0.2±0.1. |
| Fluoride | | 0.2±0.1. |
| Silicon | 23.4±0.6 | None. |
| Aluminum | 17.2±0.6 | 52.3±0.5. |
| Water | 22.0±0.4 | 4.3±0.2. |
| Sodium | 11.6±0.6 (15.6 as $Na_2O$) | None. |
| Calcium | <0.04 | Do. |
| Magnesium | 1.4±0.3 | Do. |
| Iron | 0.61±0.05 | Do. |
| Surface area (m.²/g.) | 287 | 163. |
| Bulk density (g./cc.) | 0.9 | 0.49. |
| Pellet density (g./cc.) | 1.2 | 0.81. |
| X-ray pattern | Zeolite 13X | γ alumina. |
| Average pellet size (mm.) | 2.0 spheres | 2.4 x 3.2 ellipsoids. |
| Average pellet weight (g.) | 0.008 | 0.01. |
| Average pellet volume (cc.) | 6–8 | 12–13. |

TABLE G

| Compound | Catalyst | Sample size | Temp., °C. | Mole-percent $C_5$+ | Mole-percent aromatics in $C_5$+ | Remarks |
|---|---|---|---|---|---|---|
| Cyclohexane | Pt on alumina | 5,000 | 450 | 85.5 | 98.2 | Unless otherwise noted, all activation temperatures were the same as the feed-catalyst contact temperature. |
| Do | do | 5,000 | 450 | 89.6 | 98.0 | Activated at 500° C. |
| Do | do | 5,000 | 500 | 80.8 | 98.0 | |
| Do | do | 5,000 | 550 | 53.0 | 100 | |
| Do | do | 10,000 | 450 | 90.8 | 98.2 | |
| Do | do | 10,000 | 450 | 91.7 | 97.2 | Do. |
| Do | do | 10,000 | 500 | 100 | 98.0 | |
| Do | do | 10,000 | 550 | 100 | 100 | |
| Do | Pt-loaded zeolite X | 5,000 | 450 | 99.0 | 99.0 | |
| Do | do | 5,000 | 500 | 97.5 | 97.5 | |
| Do | do | 5,000 | 550 | 99.0 | 99.0 | |
| Do | do | 10,000 | 450 | 99.0 | 99.0 | |
| Do | do | 10,000 | 500 | 98.0 | 98.0 | |
| Do | do | 10,000 | 550 | 99.0 | 99.0 | |
| Hexane | Pt on alumina | 5,000 | 450 | 28.3 | 37.0 | |
| Do | do | 5,000 | 450 | 27.2 | 44.0 | Do. |
| Do | do | 5,000 | 500 | 31.5 | 68.2 | |
| Do | do | 5,000 | 550 | 20.5 | 100 | |
| Do | do | 10,000 | 450 | 41.0 | 20.5 | |
| Do | do | 10,000 | 450 | 56.0 | 24.8 | Do. |
| Do | do | 10,000 | 500 | 53.5 | 34.3 | |
| Do | do | 10,000 | 550 | 26.0 | 96.5 | |
| Do | Pt-loaded zeolite X | 5,000 | 450 | 95.0 | 4.0 | |
| Do | do | 5,000 | 500 | 83.8 | 22.8 | |
| Do | do | 5,000 | 550 | 73.3 | 72.6 | |
| Do | do | 10,000 | 450 | 97.0 | 3.5 | |
| Do | do | 10,000 | 500 | 88.7 | 24.0 | |
| Do | do | 10,000 | 550 | 84.3 | 74.3 | |

TABLE G (Continued)

| Compound | Catalyst | Sample size | Temp., °C. | Mole-percent $C_5+$ | Mole-percent aromatics in $C_5+$ | Remarks |
|---|---|---|---|---|---|---|
| Heptane | Pt on alumina | 5,000 | 450 | 31.9 | 66.7 | |
| Do | do | 5,000 | 450 | 49.5 | 66.7 | Do. |
| Do | do | 5,000 | 450 | 82.2 | 41.8 | Activated at 550° C. |
| Do | do | 5,000 | 500 | 59.2 | 79.2 | |
| Do | do | 5,000 | 550 | 38.0 | 98.5 | |
| Do | do | 10,000 | 450 | 41.3 | 31.5 | |
| Do | do | 10,000 | 450 | 61.8 | 51.1 | Activated at 500° C. |
| Do | do | 10,000 | 450 | 88.2 | 19.0 | Activated at 550° C. |
| Do | do | 10,000 | 500 | 63.0 | 75.5 | |
| Do | do | 10,000 | 550 | 41.6 | 93.6 | |
| Do | Pt-loaded zeolite X | 5,000 | 450 | 90.0 | 14.5 | |
| Do | do | 5,000 | 500 | 85.0 | 60.0 | |
| Do | do | 5,000 | 550 | 79.8 | 85.4 | |
| Do | do | 10,000 | 450 | 95.6 | 9.0 | |
| Do | do | 10,000 | 500 | 88.0 | 67.0 | |
| Do | do | 10,000 | 550 | 83.0 | 88.0 | |
| Octane | Pt on alumina | 5,000 | 450 | 33.0 | 80.2 | |
| Do | do | 5,000 | 450 | 62.8 | 76.2 | Activated at 500° C. |
| Do | do | 5,000 | 500 | 59.5 | 84.0 | |
| Do | do | 5,000 | 550 | 40.0 | 98.2 | |
| Do | do | 10,000 | 450 | 53.0 | 56.0 | |
| Do | do | 10,000 | 450 | 63.3 | 60.8 | Do. |
| Do | do | 10,000 | 500 | 75.0 | 71.5 | |
| Do | do | 10,000 | 550 | 43.5 | 99.5 | |
| Do | Pt-loaded zeolite X | 5,000 | 450 | 87.0 | 37.5 | |
| Do | do | 5,000 | 500 | 88.2 | 80.0 | |
| Do | do | 5,000 | 550 | 80.0 | 94.5 | |
| Do | do | 10,000 | 450 | 93.2 | 40.0 | |
| Do | do | 10,000 | 500 | 91.2 | 80.5 | |
| Do | do | 10,000 | 550 | 83.2 | 95.0 | |

It will be apparent from Table G that the Pt-loaded zeolite X catalyst gives a larger amount of aromatics, at a given $C_5''$ yield, than the prior art catalyst.

FIGS. 1 and 2 illustrate the reforming selectivity and activity, respectively, of the catalyst based on experiments using the following process variables:

(1) Temperature: 450, 500 and 550° C.
(2) Pressure: 22 p.s.i.g.
(3) Weight hourly space velocity: 13 g. feed/g. catalyst/hr.
(4) $H_2$ to hydrocarbon ratio: 2–3 mols $H_2$/mol HC.

FIG. 1 shows that under these conditions the Pt-loaded zeolite X is more selective than the prior art catalyst for normal-$C_6$, $C_7$ and $C_8$ hydocarbons. This is indicated by the higher yields of $C^{5+}$ gasoline at a given percent aromatics in this gasoline. Taking n-octane as an example, it was found:

| Mol-percent aromatics in reformate | Mole-percent $C_5+$gasoline produced | |
|---|---|---|
| | Pt in zeolite X | Pt-impregnated alumina |
| 50 | 88 | 65 |
| 70 | 87 | 63 |
| 90 | 84 | 56 |

Referring now to FIG. 2, the activity of the platinum-loaded zeolite X, defined as the product of the percent aromatics and yield plotted as a function of temperature, appears to be increasing steadily with temperature. In contrast, the platinum-impregnated alumina appears to reach a maximum activity at 500° C. and then level off. Again considering n-octane:

| Temperature, °C. | Activity (yield times percent aromatics) | |
|---|---|---|
| | Pt in zeolite X | Pt-impregnated alumina |
| 450 | 33 | 39 |
| 500 | 70 | 53 |
| 550 | 78 | 44 |

Although the invention has been specifically described as related to platinum-containing molecular sieve catalysts, other catalytically active elemental metal and metal oxides may be employed. These materials include molybdenum, chromium, tungsten, vandium, nickel, cobalt, iron, copper and mixtures thereof. Such materials may be incorporated in the inner adsorption area of molecular sieves by at least one of the previously described methods. Certain metals, e.g. iron, cobalt and nickel, may also be incorporated by first contacting the molecular sieve with an aqueous solution of a water soluble salt of the metal whereby ion-exchange occurs with the metal cations of the molecular sieve. The latter is then dried and contacted with a reducing agent such as alkali metal vapors or gaseous hydrogen whereby the cations are reduced to the elemental metal.

Although preferred embodiments have been described in detail, it is contemplated that modifications of the process may be made and that some features may be employed without others, all within the spirit and scope of the invention as set forth herein.

What is claimed is:

1. A process for upgrading hydrocarbons which comprises contacting a hydrocarbonaceous fluid at hydrocarbon conversion temperature with a hydrocarbon conversion catalyst comprising a three-dimensional crystalline zeolitic molecular sieve containing within its internal adsorption region, an elemental metal selected from the group consisting of ruthenium, rhodium, palladium, osmium, iridium, and platinum, the molecular sieve having uniform sized pores sufficiently large to adsorb benzene, said metal being in the elemental zero valence form prior to said contacting with said hydrocarbonaceous fluid.

2. A process according to claim 1 in which the elemental metal is palladium.

3. A process according to claim 1 in which the elemental metal is platinum.

4. A process according to claim 1 in which zeolite X is the crystalline zeolitic molecular sieve.

5. A process according to claim 1 in which the hydrocarbon conversion catalyst is zeolite X containing highly dispersed platinum deposited within its inner adsorption region.

6. A process for the hydrogenation of cyclohexene which comprises contacting cyclohexene at elevated temperature and in a hydrogen atmosphere with a three-dimensional crystalline zeolite molecular sieve containing elemental platinum deposited in a highly dispersed state within its inner adsorption region, the molecular sieve having uniform sized pores sufficiently large to adsorb benzene.

7. A process for the conversion of tetralin to naphthalene which comprises contacting tetralin at elevated temperature and in a hydrogen atmosphere with a three-dimensional crystalline zeolitic molecular sieve containing elemental platinum deposited in a highly dispersed state within its inner adsorption region, the molecular sieve having uniform sized pores sufficiently large to adsorb benzene.

8. A process for the aromatization of cyclohexane to benzene which comprises contacting cyclohexane at elevated temperature and in a hydrogen atmosphere with a three-dimensional crystalline zeolitic molecular sieve containing elemental platinum deposited in a highly dispersed state within its inner adsorption region, the molecular sieve having uniform sized pores sufficiently large to adsorb benzene.

9. A process for the upgrading of a hydrocarbon selected from the group consisting of cyclohexane, hexane, heptane, and octane, which comprises contacting said hydrocarbon at temperature of 450°–550° C. with a three-dimensional crystalline zeolitic molecular sieve containing elemental platinum deposited in a highly dispersed state within its inner adsorption region, the molecular sieve having uniform sized pores sufficiently large to adsorb benzene.

10. A process for the dehydrogenation and aromatization of cyclic hydrocarbons which comprises contacting a cyclic hydrocarbon at elevated temperature with crystalline zeolite X containing an elemental metal selected from the group consisting of platinum, palladium, ruthenium, osmium, iridium and rhodium in the inner adsorption region of said zeolite, said metal being in the elemental zero valence form prior to said contacting with said cyclic hydrocarbon.

11. A process for upgrading hydrocarbons which comprises providing a three-dimensional crystalline zeolitic molecular sieve having uniform sized pores sufficiently large to adsorb benzene; treating the molecular sieve with a solution containing a complex metal compound, said metal being selected from the group consisting of ruthenium, rhodium, palladium, osmium, iridium and platinum, thereby introducing the complex metal in the internal adsorption region of said molecular sieve; drying the molecular sieve and decomposing the complex metal in the dried molecular sieve so as to convert such complex to the elemental form of the selected metal in a highly dispersed state within the molecular sieve's inner adsorption region; and thereafter contacting a hydrocarbonaceous fluid at hydrocarbon conversion temperature with the elemental metal-containing molecular sieve.

12. A process for upgrading hydrocarbons which comprises providing a three-dimensional crystalline zeolitic molecular sieve having uniform sized pores sufficiently large to adsorb benzene; treating the molecular sieve with an aqueous solution containing complex water-soluble metal amine cations, said metal being selected from the group consisting of ruthenium, rhodium, palladium, osmium, iridium and platinum, thereby ion-exchanging the complex metal amine with the structural cations in the internal adsorption region of said molecular sieve; removing and drying the cation-exchanged molecular sieve and heating the molecular sieve to temperature below about 350° C. in an inert atmosphere for activation thereof; further heating the activated molecular sieve to temperature below about 650° C. in an inert atmosphere thereby reducing the ion-exchanged complex cation to the elemental metal; thereafter contacting a hydrocarbonaceous fluid at hydrocarbon conversion temperature with the molecular sieve containing said elemental metal within its inner adsorption region.

13. A process according to claim 12 in which tetramine platinous cation is said complex metal amine cation.

14. A process for upgrading hydrocarbons which comprises providing an activated three-dimensional crystalline zeolitic molecular sieve having uniform sized pores sufficiently large to adsorb benzene; contacting the activated zeolitic molecular sieve in an inert atmosphere with a fluid decomposable compound of a metal selected from the group consisting of ruthenium, rhodium, palladium, osmium, iridium and platinum, thereby adsorbing such compound within the inner adsorption region of the zeolitic molecular sieve; reducing said metal to the elemental form within the molecular sieve; thereafter contacting a hydrocarbonaceous fluid at hydrocarbon conversion temperatures with the elemental metal-containing molecular sieve.

15. A process according to claim 14 in which said fluid decomposable compound is a platinum-ethylenic complex.

16. A process according to claim 14 in which zeolite X is the crystalline zeolitic molecular sieve.

References Cited by the Examiner
UNITED STATES PATENTS

| | | | |
|---|---|---|---|
| 2,884,374 | 4/1959 | Connor et al. | 208—138 |
| 2,971,903 | 2/1961 | Kimberlin et al. | 208—119 |
| 2,971,904 | 2/1961 | Gladrow et al. | 208—120 X |
| 2,983,670 | 5/1961 | Seubold | 260—688 X |
| 3,058,907 | 10/1962 | Van Nordstrand et al. | 208—138 |

DELBERT E. GANTZ, *Primary Examiner.*

ALPHONSO D. SULLIVAN, PAUL M. COUGHLAN,
*Examiners.*

C. E. SPRESSER, P. P. GARVIN, *Assistant Examiners.*